US008363701B2

United States Patent
Won et al.

(10) Patent No.: US 8,363,701 B2
(45) Date of Patent: Jan. 29, 2013

(54) METHOD AND APPARATUS FOR RECEIVING SIGNAL IN WIRELESS COMMUNICATION SYSTEM

(75) Inventors: Seung-Hwan Won, Suwon-si (KR); Soo-Bok Yeo, Suwon-si (KR); Ho-Il Kim, Yongin-si (KR); Se-Jin Kong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 12/806,859

(22) Filed: Aug. 20, 2010

(65) Prior Publication Data

US 2011/0051797 A1 Mar. 3, 2011

(30) Foreign Application Priority Data

Aug. 25, 2009 (KR) ........................ 10-2009-0078771

(51) Int. Cl.
*H04B 1/00* (2006.01)
(52) U.S. Cl. ........................................ 375/148; 375/346
(58) Field of Classification Search .................. 375/144, 375/148, 348, 349, 347, 340, 324, 229, 346
See application file for complete search history.

(56) References Cited

U.S. PATENT DOCUMENTS

| 5,646,964 A * | 7/1997 | Ushirokawa et al. ......... 375/346 |
| 8,005,128 B1 * | 8/2011 | Lamba et al. ................ 375/144 |
| 2007/0002985 A1 * | 1/2007 | Kimata et al. ................ 375/350 |
| 2007/0280336 A1 * | 12/2007 | Zhang et al. .................. 375/148 |
| 2008/0159373 A1 | 7/2008 | Taha et al. |
| 2009/0022217 A1 * | 1/2009 | Kimata .......................... 375/232 |
| 2009/0052517 A1 * | 2/2009 | Chen ............................. 375/235 |
| 2009/0168910 A1 * | 7/2009 | Futatsugi et al. ............. 375/260 |
| 2009/0225823 A1 * | 9/2009 | Chen et al. .................... 375/230 |
| 2009/0262853 A1 * | 10/2009 | Yoshida et al. ............... 375/267 |
| 2009/0268786 A1 * | 10/2009 | Matsumoto et al. .......... 375/148 |
| 2010/0046661 A1 * | 2/2010 | Yoshida et al. ............... 375/285 |
| 2010/0046682 A1 * | 2/2010 | Sikri et al. .................... 375/350 |
| 2010/0105320 A1 * | 4/2010 | Seki ............................... 455/24 |
| 2010/0278227 A1 * | 11/2010 | Sikri et al. .................... 375/232 |
| 2011/0038407 A1 * | 2/2011 | Ki et al. ........................ 375/232 |
| 2011/0085591 A1 | 4/2011 | Song et al. |
| 2011/0211630 A1 * | 9/2011 | Nakahara et al. ............. 375/232 |

FOREIGN PATENT DOCUMENTS

KR 10-2009-0131794 12/2009

* cited by examiner

*Primary Examiner* — Emmanuel Bayard (57) ABSTRACT

A mobile terminal includes a channel estimation module that is maintained in an active state. A controller determines an activation time point of an equalizer weight calculation module for calculating a tap coefficient. The activation time point is earlier than an activation time point of a main equalizer module, and activates the equalizer weight calculation module at the activation time point so as to calculate the tap coefficient. When the equalizer weight calculation module's operation is completed, the controller activates the main equalizer module, detects a mobile terminal ID, activates an interference cancellation module, and controls the main equalizer module to provide a data signal demodulator with the data signal compensated for by the tap coefficient. A demodulator demodulates the compensated data signal.

10 Claims, 7 Drawing Sheets

METHOD AND APPARATUS FOR RECEIVING SIGNAL IN WIRELESS COMMUNICATION SYSTEM

CROSS-REFERENCE TO RELATED APPLICATION(S) AND CLAIM OF PRIORITY

The present application is related to and claims priority to an application entitled "Method and Apparatus for Receiving Signal in Wireless Communication System" filed in the Korean Industrial Property Office on Aug. 25, 2009, and assigned Serial No. 10-2009-0078771, the contents of which are hereby incorporated by reference.

TECHNICAL FIELD OF THE INVENTION

The present invention relates to a method and apparatus for receiving a signal in a wireless communication system.

BACKGROUND OF THE INVENTION

In order to increase throughput for received signals in a Code Division Multiple Access (CDMA)-based packet transmission system, such as High Speed Packet Access (HSPA), an equalizer (EQ) has been proposed as an alternative to a widely-used existing rake (RAKE) receiver.

The EQ may increase throughput in comparison to the RAKE receiver, but has a problem in that its power consumption is high. Thus, the EQ is used along with the RAKE receiver, rather than instead of it. With regard to this, in order to minimize power consumption, the EQ performs only operations essential to demodulate a received signal; and the remaining operations are mainly performed by the RAKE receiver.

It is also possible to alternately operate the EQ and the RAKE receiver according to estimated signal-to-interference plus noise ratio (SINR) values. For example, The EQ may be operated in an area where an SINR has a higher value above a threshold, and the RAKE receiver may be operated in an area where an SINR has a lower value below the threshold. As the EQ is used in the higher SINR area, throughput for received signals may increase when compared to using the RAKE receiver.

However, when the RAKE receiver and EQ are alternately used according to SINR values, as mentioned above, it is impossible to always optimally operate the EQ and the RAKE receiver in a corresponding channel environment.

In a specific environment, either the RAKE receiver or the EQ is operated in order to prevent a ping-pong effect. The operation of the RAKE receiver or the EQ is determined based on whether or not a current SINR value falls within a range of SINR values, which is set for the operation of the RAKE receiver or the EQ.

However, when the current SINR value corresponds to a boundary value that is set to distinguish between the operations of the RAKE receiver and the EQ, there is no telling which of the RAKE receiver and the EQ may be operated. This may cause a problem in that, although the EQ can be more efficiently operated in a current channel environment, the RAKE receiver is actually operated. By reason of this, it is impossible to always optimally operate the RAKE receiver and the EQ in a corresponding channel environment.

In this way, many problems are involved in alternately operating a RAKE receiver and an EQ to minimize power consumption of the EQ. Therefore, there is a need for a signal reception method and apparatus that is robust to a change in channel environment and can minimize power consumption of an EQ.

SUMMARY OF THE INVENTION

To address the above-discussed deficiencies of the prior art, it is a primary object to provide a method and apparatus for receiving a signal in a wireless communication system.

Further, the present invention provides a method and apparatus for receiving a signal in a wireless communication system, which prevents an EQ from being deteriorated in performance, and minimizes power consumption by reducing the active duration time of the EQ.

Further, the present invention provides a method and apparatus for receiving a signal in a wireless communication system, which can more efficiently operate an EQ depending on a modulation scheme used by a mobile terminal.

In accordance with an aspect of the present invention, there is provided a method for receiving a signal by a mobile terminal in a wireless communication system, the method including the steps of: maintaining a channel estimation module in an active state; determining an activation time point of an equalizer weight calculation module to calculate a tap coefficient for a main equalizer module, the activation time point of the equalizer weight calculation module being earlier than an activation time point of the main equalizer module; activating the equalizer weight calculation module at the determined activation time point so as to calculate the tap coefficient; activating the main equalizer module so that the main equalizer module can receive the tap coefficient when an operation of the equalizer weight calculation module is completed; detecting a mobile terminal identifier (ID) by demodulating a control signal received over a control channel, activating an interference cancellation module so as to receive a data signal over a data channel when the detected mobile terminal ID corresponds to an ID of the mobile terminal, and controlling the main equalizer module to provide the data signal, which is compensated for by the tap coefficient, from an output of the main equalizer module to a data signal demodulator; and demodulating the compensated data signal in the data signal demodulator.

In accordance with another aspect of the present invention, there is provided an apparatus that receives a signal by a mobile terminal in a wireless communication system, the apparatus includes: a data channel receiver, which includes a channel estimation module, an equalizer weight calculation module, a main equalizer module, and an interference cancellation module; a data signal demodulator that demodulates a signal output from the data channel receiver; and a module activation controller that determines an activation time point of the equalizer weight calculation module, the activation time point of the equalizer weight calculation module being earlier than an activation time point of the main equalizer module, wherein the channel estimation module is maintained in an active state, the equalizer weight calculation module is activated at the activation time point determined by the module activation controller so as to calculate a tap coefficient for the main equalizer module, and the data signal demodulator demodulates a data signal compensated for by the tap coefficient.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, exemplary embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the gist of the present invention.

In the present invention, a new technology is described to control a data channel receiver to be operated such that it demodulates a data signal based on a result of demodulating a control signal by a control channel receiver in a high-speed wireless communication system, such as High Speed Packet Access (HSPA) and the like. For the convenience of explanation, it will be assumed in the following that the control channel receiver is a RAKE receiver, and the data channel receiver is an EQ. However, it will be apparent to those skilled in the art that the control channel receiver and the data channel receiver are not limited to the RAKE receiver and the EQ. In addition, it should be noted that the term "activation" is mingled with the term "starting or performing an operation" in describing the present invention.

In a mobile terminal having a RAKE receiver and an EQ, either the RAKE receiver or the EQ is used depending on a channel environment. It is very important that the mobile terminal be operated with low power consumption. Thus, the EQ with relatively higher power consumption than the RAKE receiver needs to process a received signal with minimum power consumption.

Accordingly, the present invention proposes a method in which the performance of processing a received signal can be improved by operating constituent modules of an EQ step by step, and can minimize power consumption by reducing the active time period of the EQ. More specially, the present invention proposes a method in which a constituent module for calculating a tap coefficient necessary to operate an EQ depending on the speed of a mobile terminal and a channel environment is previously operated in the EQ before a control signal is acquired from a RAKE receiver. This method makes it possible to not only minimize power consumption according to operations of the EQ, but also increase throughput for received signals.

Hereinafter, a structure of a receiver of a mobile terminal according to the present invention will be described with reference to FIG. 1.

Figure 1:
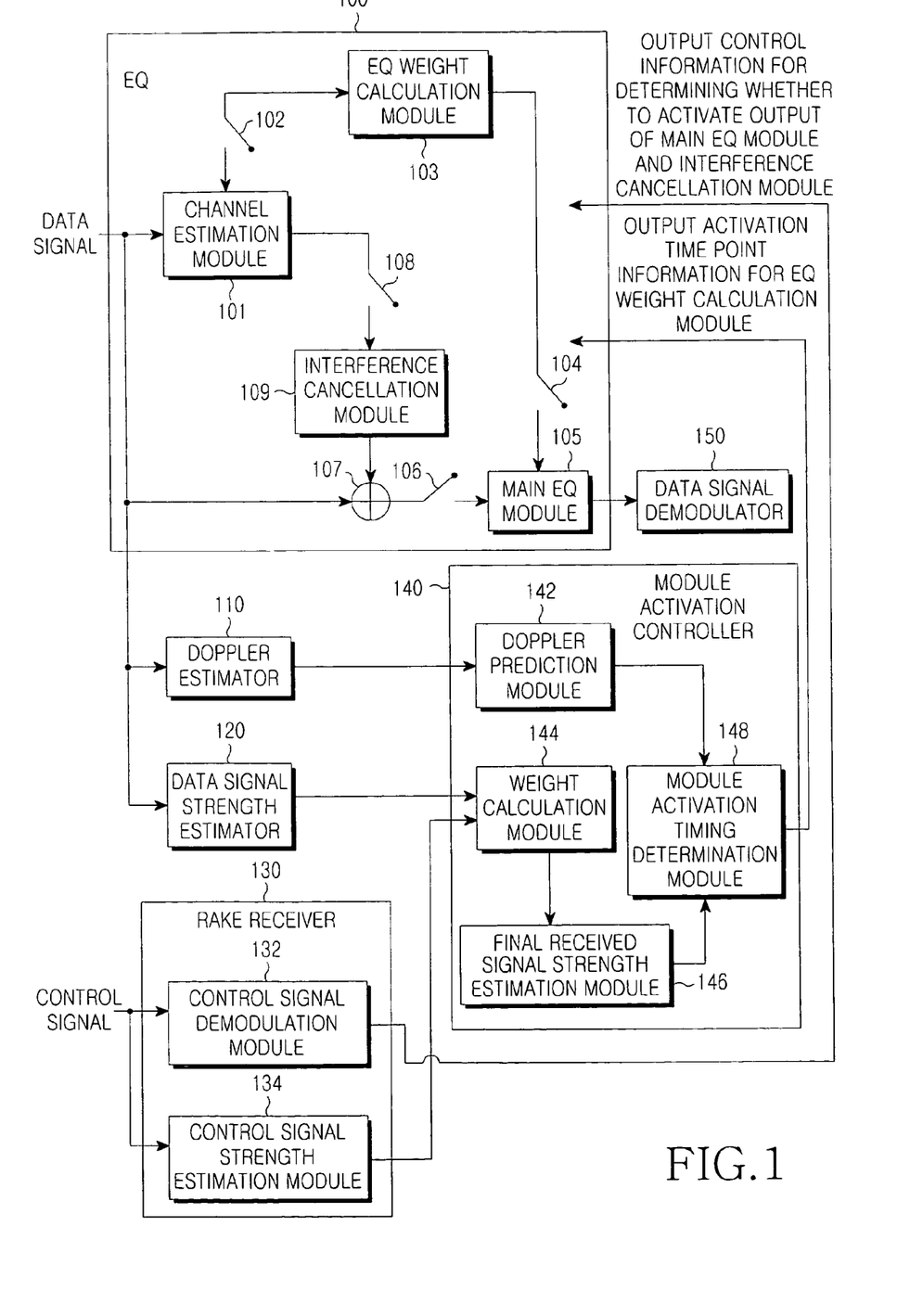
FIG. 1 illustrates a structure of a receiver of a mobile terminal in accordance with an exemplary embodiment of the present invention.

FIG. 1 illustrates a structure of a receiver of a mobile terminal according to an exemplary embodiment of the present invention.

Referring to FIG. 1, the receiver includes an EQ 100, a Doppler estimator 110, a data signal strength estimator 120, a RAKE receiver 130, a module activation controller 140, and a data signal demodulator 150.

The EQ 100 is a data channel receiver that receives a data signal, and includes a channel estimation module 101, a first switch module 102, an EQ weight calculation module 103, a second switch module 104, a main EQ module 105, a third switch module 106, a summation module 107, a fourth switch module 108, and an interference cancellation module 109. The data signal is a signal received over a data channel. The data channel may be, for example, an High Speed Physical Downlink Shared Channel (HS-PDSCH).

The channel estimation module 101 receives a signal, such as a pilot channel signal or a pilot symbol, and performs channel estimation based on the received signal. In a wireless channel environment, there is a phenomenon called fading that refers to irregular time-varying fluctuations in channel states. For channel estimation in such a wireless channel environment, the channel estimation module 101 estimate the amplitude and phase of the received signal. Also, the channel estimation module 101 outputs a result of the channel estimation to the EQ weight calculation module 103 through the first switch module 102.

The channel estimation module 101 performs channel estimation even when the operations of other constituent modules of the EQ 100 are inactive. This is intended to prevent a deterioration of the performance of the EQ 100.

If the channel estimation module 101 is inactive, as are other constituent modules of the EQ 100, then it has a time delay when being subsequently changed to an active state again. Due to such a time delay, a time delay also occurs when the result of the channel estimation is output to the EQ weight calculation module 103. Thus, the operation of the EQ 100 is delayed a time corresponding to the time delay, and consequently the performance of the EQ 100 is lowered compared to when the channel estimation module 101 is active.

Accordingly, the channel estimation module 101 is maintained in an active state, and the first switch module 102 lying between the channel estimation module 101 and the EQ weight calculation module 103 is also turned on.

The EQ weight calculation module 103 calculates a tap coefficient for compensating for the distortion of a received signal by using the result of the channel estimation, output from the channel estimation module 101. To perform this operation, the EQ weight calculation module 103 may be activated at a time point according to activation time point information output from the module activation controller 140. Here, the EQ weight calculation module 103 may also consider time information included in a pilot channel, for example, a Primary Common Pilot Channel (P-CPICH).

In the case of following the activation time point information, the EQ weight calculation module 103 starts to be operated (i.e., activated) at a time point earlier than a time point when the main EQ module 105 comes into operation. More specially, the EQ weight calculation module 103 starts to be operated at any one time point between a maximum early activation time point and an activation time point of the main EQ module 105. The maximum early activation time point refers to the earliest time point at which the EQ weight calculation module 103 may be operated before a time point when the main EQ module 105 comes into operation, and is set in units of given time intervals, for example, a time interval of 512 chips. Here, the reason why the maximum early activation time point is set in the unit of 512 chips is that the operation cycle of the EQ 100 is set in the unit of 512 chips.

However, the activation time point of the EQ weight calculation module 103 may vary according to the modulation scheme used in the mobile terminal. As an example, when a high-order modulation scheme, such as 64-Quadrature Amplitude Modulation (QAM), is used in the mobile terminal, the EQ weight calculation module 103 may start to be operated at any one time point between a maximum early activation time point, for example, a time point up to a time interval of 8×512 chips, that is, 4096 chips, and a time point when the main EQ module 105 comes into operation.

When a modulation scheme, the order of which is lower than 64-QAM, is used in the mobile terminal, the EQ weight calculation module 103 starts to be operated at a time point that is a time interval shorter than a time interval of 4096 chips ahead of a time point when the main EQ module 105 comes into operation. Of course, the time point when the EQ weight calculation module 103 starts to be operated does not depend only on the modulation scheme, as described above, and may also be determined using various parameters.

The above-mentioned 512 chips are the same unit as 2 symbols, and refers to a time interval in which there is no change in channel states on the time axis. In the following, a description will be given not in symbols, but in chips.

The main EQ module 105 is activated when the tap calculation in the EQ weight calculation module 103 is completed. The activation of the main EQ module 105 turns on the second switch module 104. Then, the tap coefficient calculated in the EQ weight calculation module 103 is output to the main EQ module 105 through the second switch module 104.

Using the output tap coefficient, the main EQ module 105 may detect a signal to be demodulated from the received signal, and output the detected signal to the data signal demodulator 150. However, this process is performed only when the received signal is a signal to be received by the mobile terminal equipped with the EQ 100 and the RAKE receiver 130 in FIG. 1.

Accordingly, the main EQ module 105 receives an interference-canceled signal output from the interference cancellation module 109, detects a signal to be demodulated from the received interference-canceled signal, and determines whether to output the detected signal to the data signal demodulator 150, based on control information output from the RAKE receiver 130.

The control information includes information indicating if a mobile terminal Identifier (ID), which is detected from a control signal received over a control channel, is the same as the ID of the mobile terminal equipped with the EQ 100 and the RAKE receiver 130 in FIG. 1. Based on this control information, the main EQ module 105 can determine if the mobile terminal ID detected after the demodulation of the control signal is the same as the ID of the corresponding mobile terminal.

When the mobile terminal ID detected after the demodulation of the control signal is the same as the ID of the corresponding mobile terminal, the third switch module 106 is turned on. Then, a signal received over a data channel is output to the main EQ module 105 through the third switch module 106.

The received signal output to the main EQ module 105 through the third switch module 106 corresponds to a signal output from the summation module 107. The summation module 107 summates an interference-canceled signal output from the interference-cancellation module 109 and a signal input to the channel estimation module 101, and provides the main EQ module 1054 with the summated signal as a received signal to be received by the corresponding mobile terminal.

When the mobile terminal ID detected after the demodulation of the control signal is determined to be the same as the ID of the corresponding mobile terminal, based on the control information provided from the RAKE receiver 130, the fourth switch module 108 is turned on. That is, whether the fourth switch module 108 is turned on or off is determined depending on a result of the demodulation of the control signal, provided from the RAKE receiver 130. Whether or not the interference cancellation module 109 is activated is also determined depending on the result of the demodulation of the control signal, provided from the RAKE receiver 130.

The interference cancellation module 109 is activated based on the control information output from the RAKE receiver 130. That is, the interference cancellation module 109 is activated when the mobile terminal ID detected in the RAKE receiver 130 is the same as the ID of the corresponding mobile terminal.

In addition to the information indicating if the detected mobile terminal ID is the same as the ID of the corresponding mobile terminal, the control information also includes information indicating an activation time point of the interference cancellation module 109.

Accordingly, the interference cancellation module 109 is activated at a time point corresponding to the activation time point information, and cancels interference signals from a signal received through the fourth switch module 108. As an example, the interference cancellation module 109 performs interference cancellation for a non-orthogonal synchronization channel signal and a common pilot channel (CPICH) signal, which are susceptible to interference, in an HSDPA-based wireless communication system.

In the so-configured EQ 100, the EQ weight calculation module 103, the main EQ module 105, and the interference cancellation module 109 are activated and operated in that order.

In particular, when the mobile terminal ID detected after the demodulation of the control signal is the same as the ID of the corresponding mobile terminal, the interference cancellation module 109 is activated and starts to be operated, and an output of the main EQ module 105 is provided to the data signal demodulator 150. The constituent modules of the EQ 100 continue to be operated during the reception of a data signal.

When the mobile terminal ID detected after the demodulation of the control signal is not the same as the ID of the corresponding mobile terminal, all the constituent modules except the channel estimation module 101 and the first switch module 102 are inactive after a preset time corresponding to a time interval of 512 chips elapses.

Next, reference will be made to constituent modules of the RAKE receiver 130.

The RAKE receiver 130 is a receiver that receives a control signal, and includes a control signal demodulation module 132 and a control signal strength estimation module 134.

The control signal demodulation module 132 demodulates a control signal including data signal-related information, which is received over a control channel. As an example, the control channel may be an High Speed Shared Control Channel (HS-SCCH).

When the control channel is the HS-SCCH, the control signal demodulation module 132 demodulates a part 1 signal of the HS-SCCH to thereby detect a mobile terminal ID. The part 1 signal includes channelization code set information, modulation scheme information, and so forth.

The control signal demodulation module 132 determines if the detected mobile terminal ID is the same as the ID of the corresponding mobile terminal. This is intended to determine if a data signal to be received corresponds to a signal to be received by the corresponding mobile terminal.

When the detected mobile terminal ID is not the same as the ID of the corresponding mobile terminal, it is not necessary to demodulate a data signal. That is, a signal detected in the EQ 100 does not need to be output to the data signal demodulator 150. Thus, based on a result of the determination, the control signal demodulation module 132 outputs control information to the EQ 100 so as to determine if the constituent modules of the EQ 100, in particular, the output of the main EQ module 105 and the interference cancellation module 109, are activated.

Then, in the EQ 100, the fourth switch module 108 is turned on, and the interference cancellation module 109 is activated and operated at an activation time point included in the control information when the detected mobile terminal ID is the same as the ID of the corresponding mobile terminal. Also, an output of the main EQ module 105 is provided to the data signal demodulator 150. The operations of the EQ weight calculation module 103, the main EQ module 105, and the interference cancellation module 109 in the EQ 100 maybe performed during a time interval indicated by the control information, in which a data signal is transmitted.

In this way, when the detected mobile terminal ID is not the same as the ID of the corresponding mobile terminal, the constituent modules, other than the channel estimation module 101 and the first switch module 102 in the EQ 100, are inactive during the next operation cycle of the EQ 100.

The control signal strength estimation module 134 estimates the strength of a received control signal. The control signal strength estimation module 134 may estimate the strength of a control signal based on a pilot signal strength obtained by measuring the strength of a pilot signal, or directly estimate the strength of a control signal by using control channel information.

The strength of a control signal maybe considered a channel quality indicator (CQI) in the RAKE receiver 130, and may be estimated, for example, by measuring a signal-to-interference-plus noise ratio (SINR) or the amount of signals received during a preset time interval. For the convenience of explanation, it will be assumed in the following that the strength of a control signal is estimated as an SINR value. With regard to this, the control signal strength estimation module 134 outputs the estimated SINR value to a weight calculation module 144 of the module activation controller 140.

Next, reference will be made to the Doppler estimator 110 and the data signal strength estimator 120 that provide the module activation controller 140 with necessary information.

The Doppler estimator 110 estimates the moving speed of the mobile terminal by using pilot channel information, and the like, and outputs the estimated speed information to a Doppler prediction module 142 of the module activation controller 140. Here, estimating the moving speed of the mobile terminal is meant to acquire information on a modulation scheme, which supports a maximum data receive rate among modulation schemes currently available to the mobile terminal, in order to control the operation of the EQ 100. As an example, 64 QAM maybe used as the modulation scheme supporting the maximum data receive rate when the moving speed of the mobile terminal is low, 16 QAM may be used as the modulation scheme supporting the maximum data receive rate when the moving speed of the mobile terminal is medium, and Quadrature Phase Shift Keying (QPSK) may be used as the modulation scheme supporting the maximum data receive rate when the moving speed of the mobile terminal is high. That is, the modulation scheme supporting the maximum data receive rate may vary according to the moving speed of the mobile terminal.

The speed information estimated in the Doppler estimator 110 may be used in other constituent modules for other purposes. Also, a modulation scheme used in the mobile terminal may be identified based on parameters (e.g., control signal) other than the moving speed of the mobile terminal.

The data signal strength estimator 120 estimates the strength of a received data signal. Similar to the control signal strength estimation module 134, the data signal strength estimator 120 may estimate the strength of a data signal based on a measured pilot signal strength, or may directly estimate the strength of a data signal by using data channel information.

The strength of a data signal may be considered a CQI in the EQ 100, and may be estimated, for example, by measuring an SINR or the amount of signals received during a preset time interval. For the convenience of explanation, it will be assumed in the following that the strength of a data signal is estimated as an SINR value. With regard to this, the data signal strength estimator 120 outputs information on the estimated SINR value and the estimation time point of the SINR value to the weight calculation module 144 of the module activation controller 140.

Next, reference will be made to the module activation controller 140 that determines the activation time point of the EQ weight calculation module 103.

The module activation controller 140 includes the Doppler prediction module 142, the weight calculation module 144, a final received signal strength estimation module 146, and a module activation timing determination module 148.

If the speed information for the mobile terminal is output from the Doppler estimator 110, then the Doppler prediction module 142 identifies one speed group corresponding to the speed information among multiple preset speed groups. The multiple speed groups have speed ranges corresponding thereto respectively.

As an example, the multiple speed groups may be divided into a low-speed group, a medium-speed group, and a high-speed group according to the moving speed of the mobile terminal. For example, the low-speed group may have a speed range of 0 to 10 km/h, the medium-speed group may have a speed range of 10 to 60 km/h, and the high-speed group may have a speed range of 60 km/h or more. Of course, the number of the speed groups and the speed ranges corresponding to the speed groups are not limited to the above example, and may be changed in various manners.

The Doppler prediction module 142 outputs information on the identified speed group to the module activation timing determination module 148.

The weight calculation module 144 calculates a difference between a current time point and a time point when the strength of a data signal, that is, an SINR value, is estimated in the data signal strength estimator 120, and determines a first weight value and a second weight value based on the calculated difference value. That is, the weight calculation module 144 determines the first and second weight values depending on how much time has passed from the time point when the SINR value was estimated in the data signal strength estimator 120 to the current time point.

The first weight value means a weight value to be applied to an SINR value estimated in the control signal strength estimation module 134, and the second weight value means a weight value to be applied to an SINR value estimated in the data signal strength estimator 120. A way to calculate the first and second weight values will be described in detail below.

The first and second weight values calculated in the weight calculation module 144 are output to the final received signal strength estimation module 146.

The final received signal strength estimation module 146 multiplies an SINR value, estimated in control signal strength estimation module 134, by the first weight value, and multiplies an SINR value, estimated in the data signal strength estimator 120, by the second weight value. Also, the final received signal strength estimation module 146 estimates a final received signal strength by summing the SINR value estimated in the control signal strength estimation module 134; multiplying by the first weight value and the SINR value estimated in the data signal strength estimator 120; and multiplying by the second weight value.

The final received signal strength may be expressed by "Ior/Ioc" that is a ratio of the power of neighbor cells and white noise to the power of a corresponding cell. The SINR value estimated in the control signal strength estimation module 134 maybe referred to as an SINR value estimated in the RAKE receiver 130. Further, the SINR value estimated in the data signal strength estimator 120 may be referred to as an SINR value estimated in the EQ 100 because it is estimated using a received signal input to the EQ 100.

A way to estimate the final received signal strength is expressed by Equation 1:

$$Ior/Ioc = weight\_1 * (criterion\ 1) + weight\_2 * (criterion\ 2) \quad [\text{Eqn. 1}]$$

In Equation 1, Ior/Ioc denotes the final received signal strength, weight_1 denotes the first weight value, weight_2 denotes the second weight value, criterion 1 denotes an SINR value estimated in the RAKE receiver 130, and criterion 2 denotes an SINR value estimated from a data signal.

The final received signal strength estimation module 146 outputs the final received signal strength estimated using Equation 1 to the module activation timing determination module 148.

The module activation timing determination module 148 determines activation time point information for the EQ weight calculation module 103, based on the information on the speed group corresponding to the moving speed of the mobile terminal, output from the Doppler prediction module 142, and the final received signal strength output from the final received signal strength estimation module 146. Also, the module activation timing determination module 148 outputs the determined activation time point information to the EQ 100.

The information on the speed group is used to detect which modulation scheme maximizes a data receive rate among modulation schemes currently available to the mobile terminal. This is because a modulation scheme maximizing a data receive rate varies according to the moving speed of the mobile terminal. As another example, the modulation scheme maximizing a data receive rate maybe detected using other known parameters.

In this way, the activation time point information for the EQ weight calculation module 103 can be determined based on the modulation scheme maximizing a data receive rate and the level of the final received signal strength.

A procedure of determining the activation time point information for the EQ weight calculation module 103 by the module activation timing determination module 148 will be described in detail below.

Hereinafter, how the EQ 100 and the RAKE receiver 130 are operated on the time axis will be described with reference to FIG. 2.

Figure 2:
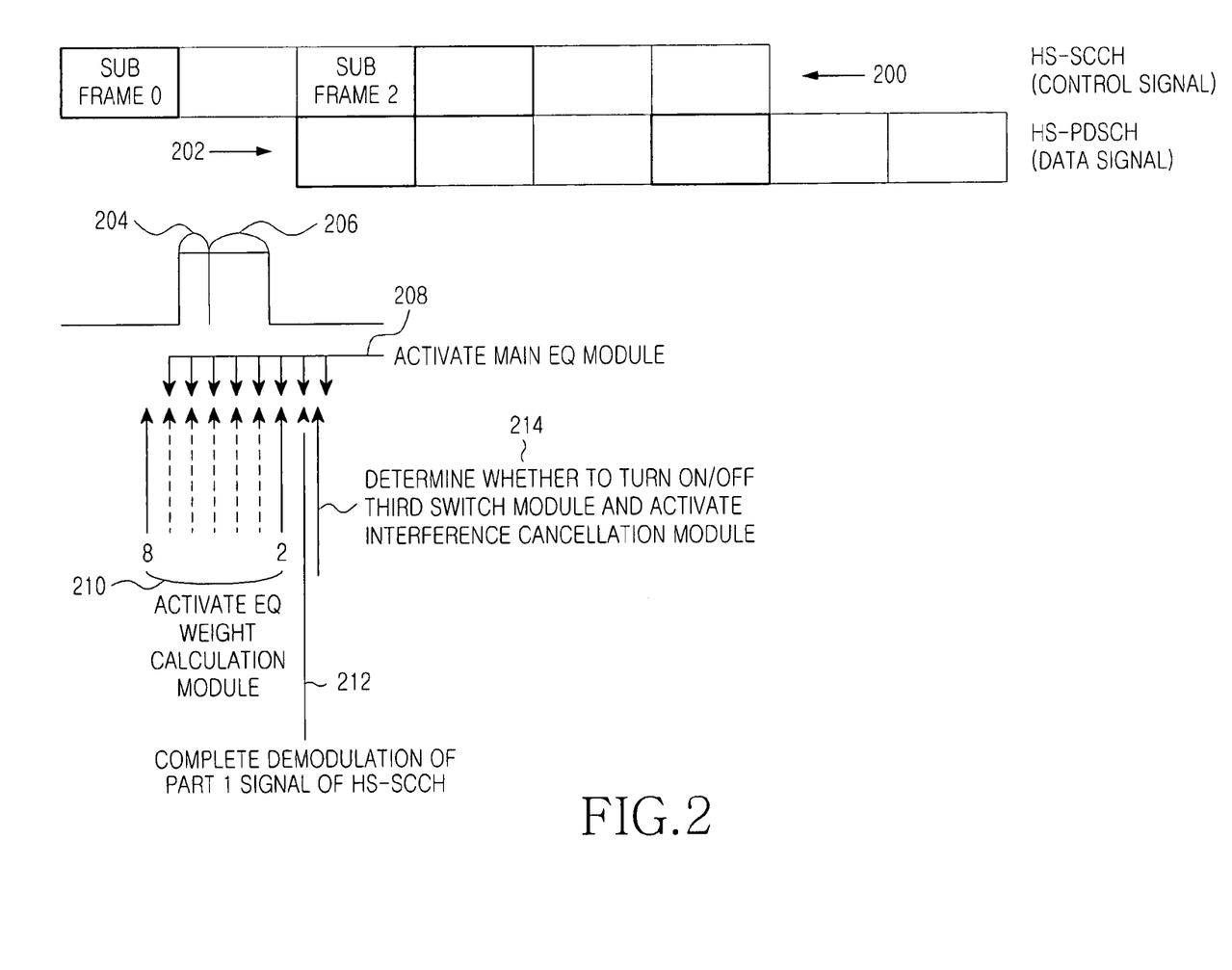
FIG. 2 illustrates operations of an EQ and a RAKE receiver along the time axis in accordance with an exemplary embodiment of the present invention.

FIG. 2 illustrates operations of the EQ 100 and the RAKE receiver 130 on the time axis according to an exemplary embodiment of the present invention.

Referring to FIG. 2, a control signal 200 is received two subframes (i.e., 5120 Tc) ahead of a data signal 202. Here, Tc means a length of one chip interval. In FIG. 2, by way of example, it is assumed that the control signal is a signal received over an HS-SCCH, and the data signal 202 is a signal received over an HS-PDSCH.

On receiving the control signal 200, the RAKE receiver 130 corrects the received control signal 200 to the extent of a delayed time, and performs a RAKE combining process for combining the corrected signal. Also, the RAKE receiver 130 performs the demodulation of a part 1 signal of the HS-SCCH.

The EQ 100 activates the main EQ module 105 after a time delay 204 according to the RAKE combining process and a time delay 206 for the demodulation of the part 1 signal of the HS-SCCH.

The EQ weight calculation module 103 is operated in advance before the main EQ module 105 is activated (designated by reference numeral "208") and operated. That is, when 64 QAM is used as a modulation scheme supporting a maximum data receive rate, the EQ weight calculation module 103 may be operated in advance at a time point that is, for example, an interval of 8×512 chips before a time point when the main EQ module 105 finally starts to be operated. Referring to FIG. 2, it is possible to activate the EQ weight calculation module 103 in advance in the range from time point 2 representing a minimum early activation time point to time point 8 representing a maximum early activation time point (designated by reference numeral "210").

If the demodulation of the part 1 signal of the HS-SCCH is completed after the time delay 204 according to the RAKE combining process and the time delay 206 for the demodulation of the part 1 signal of the HS-SCCH, then the third switch module 106 connected to the main EQ module 105 is turned on or off and whether or not the interference cancellation module 109 is activated is determined depending on a result of the demodulation of the part 1 signal of the HS-SCCH.

Now, the operations of the EQ 100 and the RAKE receiver 130, shown in FIG. 2, will be described in more detail with reference to FIG. 3.

Figure 3:
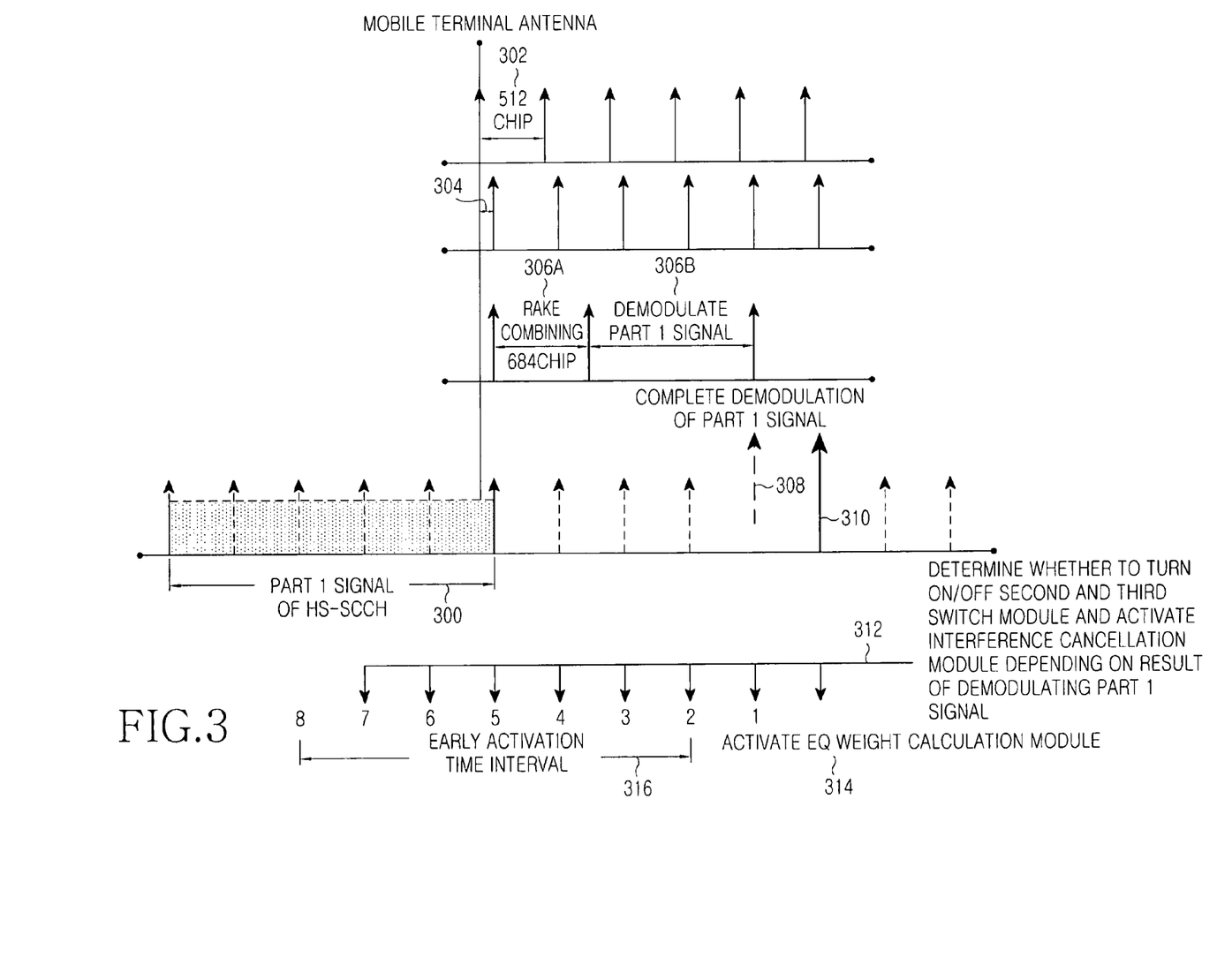
FIG. 3 illustrates operations of an EQ and a RAKE receiver along the time axis in accordance with an exemplary embodiment of the present invention.

FIG. 3 illustrates operation procedures of the EQ 100 and the RAKE receiver 130 on the time axis according to an exemplary embodiment of the present invention.

Referring to FIG. 3, when the part 1 signal of the HS-SCCH, which is a control signal, is transmitted, the RAKE receiver 130 receives and processes the part 1 signal in units of 512 chips. This is because the operation cycle of the EQ 100 is set in the unit of 512 chips.

Since the RAKE receiver 130 receives the part 1 signal through an interface, for example, an antenna, the RAKE receiver 130 considers a time delay 304 caused by receiving the part 1 signal thought the antenna.

After the time delay 304, the RAKE receiver 130 performs the RAKE combining process 306a. Although the RAKE combining process 306a in FIG. 3 is illustrated as being performed during a time interval of 684 chips by way of example, it is obvious to those skilled in the art that a time of performing the RAKE process 306a may vary according to the performance of the RAKE receiver 130 and the length of a received signal.

On completing the RAKE combining process 306a, the RAKE receiver 130 demodulates the part 1 signal (designated by reference numeral "306b"). On completing the demodulation of the part 1 signal (designated by reference numeral "308"), the RAKE receiver 130 detects a mobile terminal ID. Also, the RAKE receiver 130 determines if the detected mobile terminal ID is the same as the ID of the corresponding mobile terminal, and transmits a result of the determination to the EQ 100.

The third switch module 106 connected to the EQ 100 is turned on or off and whether or not the interference cancellation module 109 is activated is determined depending on the result of the determination (designated by reference numeral "312").

That is, when the detected mobile terminal ID is the same as the ID of the corresponding mobile terminal, the interference cancellation module 109 is activated, and the third switch module 106 is turned on at a time point 310 following a time point when the demodulation of the part 1 signal is completed, so that an output of the main EQ 105 is provided to the data signal demodulator 150.

Alternatively, when the detected mobile terminal ID is not the same as the ID of the corresponding mobile terminal, the interference cancellation module 109 is maintained in an inactive state, and the third switch module 106 is turned off at a time point 310 following a time point when the demodulation of the part 1 signal is completed, so that an output of the main EQ 105 is not provided to the data signal demodulator 150.

The EQ weight calculation module 103 is activated in advance (designated by reference numeral "314") before the main EQ module 105 is activated. As an example, a time point when the EQ weight calculation module 103 is activated may be any one time point within an early activation time interval 316, as illustrated in FIG. 3. The early activation time interval is defined as an interval between a minimum early activation time point (e.g. time point 2) and a maximum early activation time point (e.g. time point 8).

The time point when the EQ weight calculation module 103 is activated may vary according to a modulation scheme supporting a maximum data receive rate or a channel environment.

In order to allow the activation time point of the EQ weight calculation module 103 to be more usefully adjusted according to a corresponding channel environment, a register may be used. As an example, a 4-bit register so configured that it can adjust a maximum of eight 512-chip interval units may be used.

Even when the time delay according to the RAKE combining process and the time delay for the demodulation of the part 1 signal of the HS-SCCH in the RAKE receiver 130 is considered, as described above, information on the mobile terminal ID may be acquired according to the demodulation of the part 1 signal before the HS-PDSCH signal is received. Thus, it is possible to previously determine if a data signal to be received is a signal to be received by the corresponding mobile terminal, and activate the EQ weight calculation module 103 ahead of the main EQ module 105. Accordingly, there is an advantage of efficiently operating the main EQ and minimizing a performance deterioration.

Next, operations of the EQ 100, the RAKE receiver 100, and module activation controller 140 included in the mobile terminal according to an exemplary embodiment of the present invention will be described in that order.

First, reference will be made to the operation of the EQ 100 with reference to FIG. 4.

Figure 4:
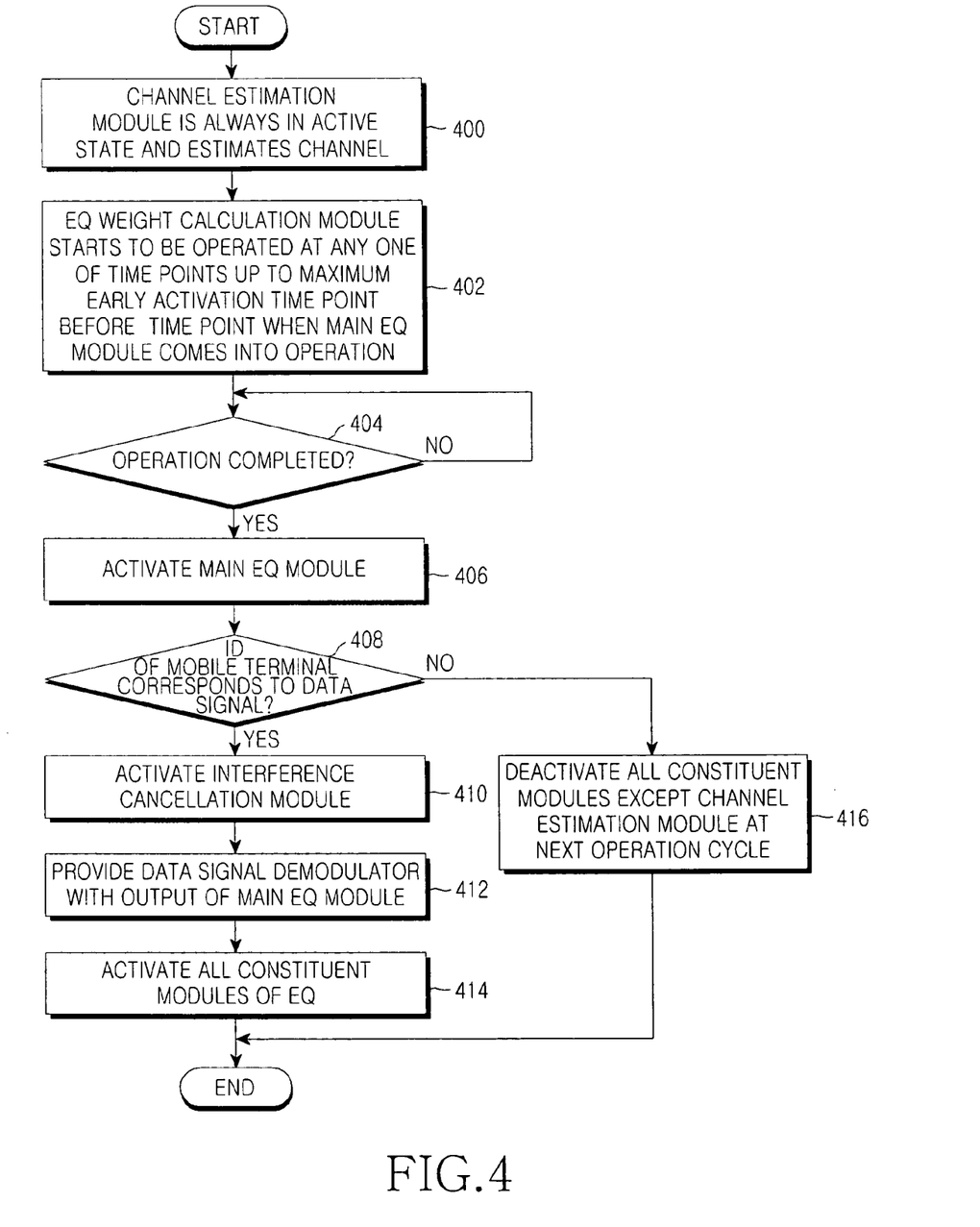
FIG. 4 illustrates an operation procedure of an EQ in accordance with an exemplary embodiment of the present invention.

FIG. 4 illustrates an operation procedure of the EQ 100 according to an exemplary embodiment of the present invention.

Referring to FIG. 4, instep 400, the channel estimation module 101 performs channel estimation while being active, and outputs a result of the channel estimation to the EQ weight calculation module 103. The channel estimation module 101 is operated even when other constituent modules of the EQ 100 are inactive, and the first switch module 102 lying between the channel estimation module 101 and the EQ weight calculation module 103 is also always turned on.

In step 402, the EQ weight calculation module 103 starts to be operated at any one of time points up to a maximum early activation time point, which are earlier than a time point when the main EQ module 105 comes into operation.

More specially, the EQ weight calculation module 103 calculates a tap coefficient by using the result of the channel estimation at a time point according to activation time point information determined by the module activation timing determination module 148 of the module activation controller 140. Here, it is also possible for the EQ weight calculation module 103 to come into operation in consideration of time information included in a pilot channel, for example, a P-CPICH.

If the operation of the EQ weight calculation module 103 is completed in step 404, then the main EQ module 105 is activated in step 406. With regard to this, an output of the main EQ module 105 is not immediately provided to the data signal demodulator 150. This is because it is not necessary to demodulate a received data signal when the data signal is a signal that the corresponding mobile terminal does not have to receive. That is, an output of the main EQ module 105 is provided to the data signal demodulator 150 only when a received data signal is a signal that the corresponding mobile terminal has to receive. Accordingly, in order to determine if a data signal to be received is a signal to be received by the corresponding mobile terminal, the main EQ module 105 determines in step 408 if the ID of the corresponding mobile terminal corresponds to the data signal to be received.

Based on control information output from the control signal demodulation module 132 of the RAKE receiver 130, the main EQ module 105 can determine if a mobile terminal ID corresponding to the data signal to be received is the same as the ID of the corresponding mobile terminal. This is possible because the control information includes information on whether or not the mobile terminal ID detected by demodulating the part 1 signal of the HS-SCCH in the RAKE receiver 130 is the same as the ID of the corresponding mobile terminal.

When the detected mobile terminal ID is the same as the ID of the corresponding mobile terminal, the interference cancellation module 109 is activated in step 410.

After the interference cancellation module 109 is activated, a signal obtained by summating an interference-canceled signal output from the interference cancellation module 109 and a signal input to the channel estimation module 101 is output to the main EQ module 105. Then, using the tap coefficient calculated in the EQ weight calculation module 103, the main EQ module 105 detects a desired signal from the received signal, and subsequently compensates for signal distortion. Also, the main EQ module 105 outputs a resultant signal to the data signal demodulator 150. In this way, an output of the main EQ module 105 is provided to the data signal demodulator 150 in step 412.

In step 414, all the constituent modules of the EQ 100 are brought into an active state. That is, all the constituent modules of the EQ 100 are active during a transmission time of the data signal corresponding to the ID of the corresponding mobile terminal. Also, after the transmission time of the data signal elapses, step 408 and following steps may be performed again.

However, when the detected mobile terminal ID is determined as not the same as the ID of the corresponding mobile terminal in step 408, an output of the main EQ module 105 is ignored, and in step 414, all the constituent modules of the EQ 100, except the channel estimation module 101 and the first switch module 102, are inactive in the next operation cycle after a time interval of 512 chips passes.

Next, reference will be made to the operation of the RAKE receiver 130 with reference to FIG. 5.

Figure 5:
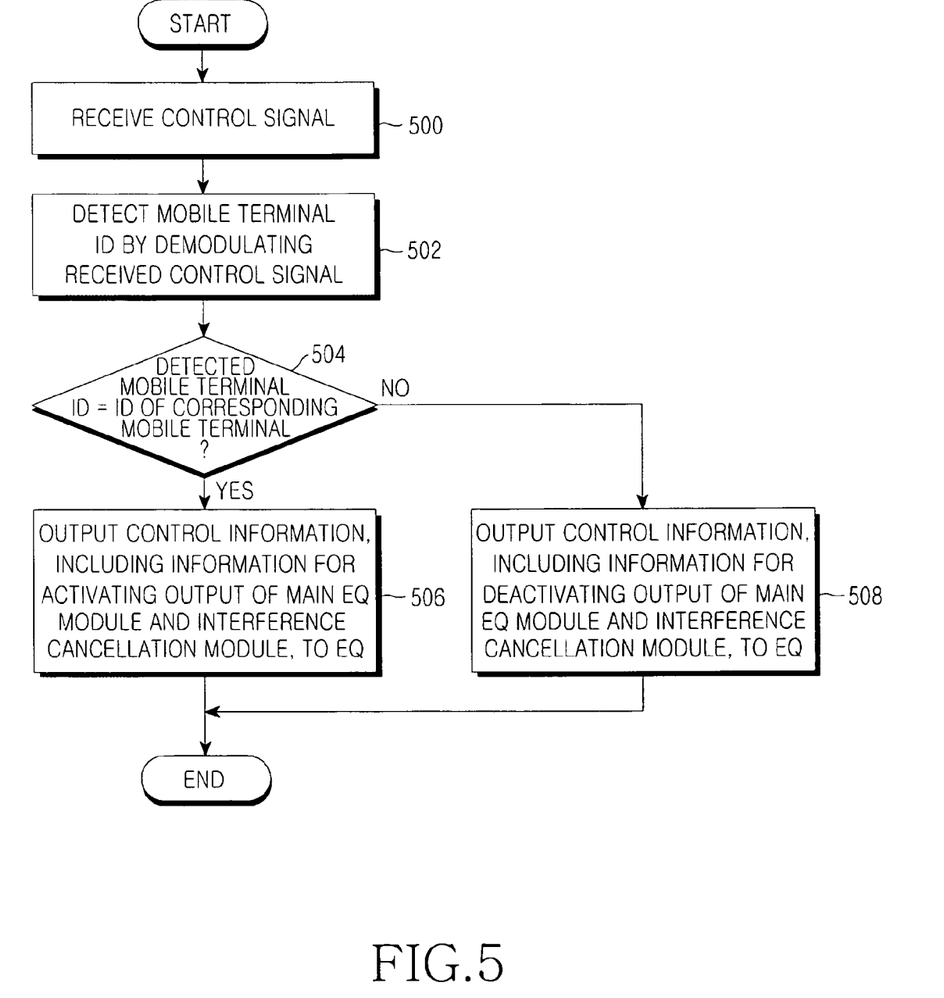
FIG. 5 illustrates an operation procedure of a RAKE receiver in accordance with an exemplary embodiment of the present invention.

FIG. 5 illustrates an operation procedure of the RAKE receiver 130 according to an exemplary embodiment of the present invention.

Referring to FIG. 5, in step 500, the control signal demodulation module 132 determines if a control signal is received. As an example, the control signal may be the part 1 signal of the HS-SCCH.

Subsequently, in step 502, the control signal demodulation module 132 demodulates the received control signal to thereby detect a mobile terminal ID. Also, the control signal demodulation module 132 determines in step 504 if the detected mobile terminal ID is the same as the ID of the corresponding mobile terminal.

When the detected mobile terminal ID is the same as the ID of the corresponding mobile terminal, the control signal demodulation module 132 proceeds to step 506, and outputs control information to the EQ 100. Here, the control information includes information for activating an output of the main EQ module 105 and the interference cancellation module 109, that is, information for allowing an output of the main EQ module 105 to be provided to the data signal demodulator 150 and activation time point information for the interference cancellation module 109.

Alternatively, when the detected mobile terminal ID is not the same as the ID of the corresponding mobile terminal, the control signal demodulation module 132 proceeds to step 508, and outputs control information, including information for deactivating an output of the main EQ 105 and the interference cancellation module 109, to the EQ 100.

Although not illustrated in FIG. 5, the control signal strength estimation module 134 estimates the strength of the received control signal, and outputs information on the estimated control signal strength to the weight calculation module 144 of the module activation controller 140.

Next, reference will be made to the operation of the module activation controller 140 with reference to FIG. 6.

Figure 6:
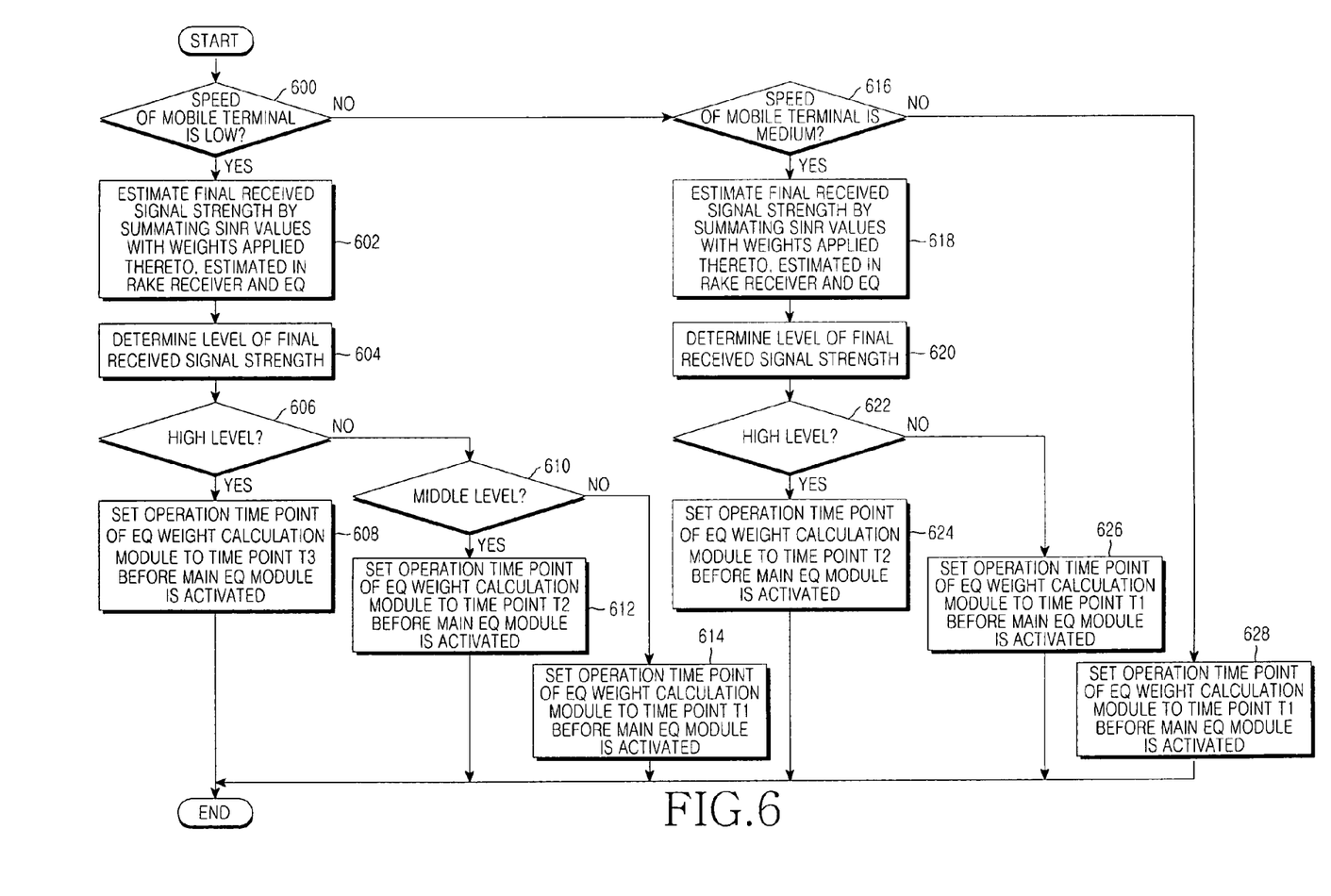
FIG. 6 illustrates an operation procedure of a module activation controller in accordance with an exemplary embodiment of the present invention.

FIG. 6 illustrates an operation procedure of the module activation controller 140 according to an exemplary embodiment of the present invention.

The module activation controller 140 determines an activation time point for the EQ weight calculation module 105 in order to minimize a loss in the throughput of the EQ 100 depending on the moving speed of the mobile terminal and the final received signal strength.

Before the operation procedure in FIG. 6, if speed information for the mobile terminal is output from the Doppler estimator 110, then the Doppler prediction module 142 identifies one speed group corresponding to the speed information among multiple preset speed groups. This is meant to detect a modulation scheme that corresponds to the speed of the mobile terminal and thus supports a maximum data receive rate.

In FIG. 6, by way of example, it is assumed that the multiple speed groups are divided into a low-speed group, a medium-speed group, and a high-speed group. With regard to this, the low-speed group may have a speed range of 0 to 10 km/h and correspond to a modulation scheme of 64 QAM, the medium-speed group may have a speed range of 10 to 60 km/h and correspond to a modulation scheme of 16 QAM, and the high-speed group may have a speed range of 60 km/h or more and correspond to a modulation scheme of QPSK. Of course, the number of the speed groups and the speed ranges and modulation schemes corresponding to the speed groups are not limited thereto, and may be changed in various manners.

Referring now to FIG. 6, in step 600, the Doppler prediction module 142 proceeds to step 602 when the identified speed group is the low-speed group, that is, the speed of the mobile terminal is low (less than 10 km/h). Since the low-speed group corresponds to the modulation scheme of 64 QAM, it can be noted that steps 602 to 612 are performed when the mobile terminal uses the modulation scheme of 64 QAM as the modulation scheme supporting a maximum data receive rate. The Doppler prediction module 142 outputs the identified speed group information to the module activation timing determination module 148.

In step 602, the final received signal strength estimation module 146 estimates a final received signal strength by summating SINR values with weights applied thereto, which are estimated in the RAKE receiver 130 and the EQ 100. More specially, the final received signal strength estimation module 146 estimates a final received signal strength by multiplying an SINR value estimated in the RAKE receiver 130 by a first weight value, multiplying an SINR value estimated in the EQ 100 by a second weight value, and summating the resultant SINR values.

The first weight value means a weight value to be applied to an SINR value estimated in the control signal strength estimation module 134, and the second weight value means a weight value to be applied to an SINR value estimated in the data signal strength estimator 120. The first and second weight values are calculated in the weight calculation module 146, and then are output to the final received signal strength estimation module 146. A way for the weight calculation module 146 to calculate the first and second weight values will be described in detail with reference to FIG. 7.

Also, the final received signal strength estimated by the final received signal strength estimation module 146 in step 602 is output to the module activation timing determination module 148.

Then, the module activation timing determination module 148 determines activation time point information for the EQ weight calculation module 103, based on the speed group information output from the Doppler prediction module 142 and the final received signal strength output from the final received signal strength estimation module 146.

More specially, the module activation timing determination module 148 determines that the modulation scheme of 64 QAM can be used as the modulation scheme supporting a maximum data receive rate in the mobile terminal, based on the fact that the output speed group information indicates the low-speed group, and measures the level of the final received signal strength in step 604.

When the speed of the mobile terminal is low, the level of the final received signal strength may be divided into three levels, that is, high, middle, and low levels. Here, as an example, the level of the final received signal strength is identified as the low level when the final received signal strength is less than 6 dB, as the middle level when the final received signal strength is equal to or greater than 6 dB and less than 15 dB, and as the high level when the final received signal strength is equal to or greater than 15 dB. Of course, a way to identify the level of the final received signal strength may be changed in various manners.

When the level of the final received signal strength corresponds to the high level greater than 15 dB in step 606, the module activation timing determination module 148 proceeds to step 608, and sets the operation time point of the EQ weight calculation module 103 to time point T3 before the main EQ module 105 is activated. Time point T3 may be a maximum early activation time point in an early activation time interval corresponding to 64 QAM.

When the level of the final received signal strength does not correspond to the high level in step 606, the module activation timing determination module 148 determines in step 610 if the level of the final received signal strength corresponds to the middle level ranging from 6 dB to 15 dB. If the level of the final received signal strength is determined to correspond to the middle level, then the module activation timing determination module 148 proceeds to step 612.

In step 612, the module activation timing determination module 148 sets the operation time point of the EQ weight calculation module to time point T2 before the main EQ module 105 is activated. Here, time point T2 may be a specific time point between time point T3 and time point T1, that is, between a maximum early activation time point and a minimum early activation time point in an early activation time interval corresponding to 64 QAM.

When the level of the final received signal strength does not correspond to the middle level in step 610, the module activation timing determination module 148 determines that the level of the final received signal strength corresponds to the low level less than 6 dB. Also, the module activation timing determination module 148 proceeds to step 614, and sets the operation time point of the EQ weight calculation module 103 to time point T1 before the main EQ module 105 is activated. Here, time point T1 may be a minimum early activation time point in an early activation time interval corresponding to 64 QAM.

When the speed of the mobile terminal is not low in step 600, the final received signal strength estimation module 146 proceeds to step 616, and determines if the speed of the mobile terminal corresponds to the medium speed ranging from 11 km/h to 60 km/h. That is, the final received signal strength estimation module 146 determines if the speed group identified in the Doppler prediction module 142 is the medium-speed group. If the speed of the mobile terminal is determined to belong to the medium-speed group, then the final received signal estimation module 146 proceeds to step 618. Since the medium-speed group corresponds to the modulation scheme of 16 QAM, it can be noted that steps 618 to 626 are performed when the mobile terminal uses the modulation scheme of 16 QAM as the modulation scheme supporting a maximum data receive rate.

In step 618, the final received signal strength estimation module 146 estimates a final received signal strength by summating SINR values with weights applied thereto, which are estimated in the RAKE receiver 130 and the EQ 100. More specially, the final received signal strength estimation module 146 estimates a final received signal strength by multiplying an SINR value estimated in the RAKE receiver 130 by a first weight value, multiplying an SINR value estimated in the EQ 100 by a second weight value, and summating the resultant SINR values. The final received signal strength estimated by the final received signal strength estimation module 146 in step 618 is output to the module activation timing determination module 148.

In step 620, the module activation timing determination module 148 determines the level of the final received signal strength. When the speed of the mobile terminal is medium, the level of the final received signal strength may be divided into two levels, that is, high and low levels. Here, the level of the final received signal strength may be identified as the low level when the final received signal strength is less than 15 dB, and as the high level when signal strength is equal to or greater than 15 dB.

When the level of the final received signal strength corresponds to the high level in step 622, the module activation timing determination module 148 proceeds to step 624, and sets the operation time point of the EQ weight calculation module 103 to time point T2 before the main EQ module 105 is activated. Time point T2 may be a maximum early activation time point in an early activation time interval corresponding to 16 QAM.

When the level of the final received signal strength does not correspond to the high level in step 622, the module activation timing determination module 148 determine that the level of the final received signal strength corresponds to the low level, and proceeds to step 626. In step 626, the module activation timing determination module 148 sets the operation time point of the EQ weight calculation module to time point T1 before the main EQ module 105 is activated. Here, time point T1 may be a minimum early activation time point in an early activation time interval corresponding to 16 QAM.

When the speed of the mobile terminal is not medium in step 616, the final received signal strength estimation module 146 determines that the speed of the mobile terminal corresponds to the high speed equal to or greater than 60 km/h. That is, the final received signal strength estimation module 146 determines that the speed group identified in the Doppler prediction module 142 is the high-speed group. Since the high-speed group corresponds to the modulation scheme of QPSK, it can be noted that step 628 is performed when the mobile terminal uses the modulation scheme of QPSK as the modulation scheme supporting a maximum data receive rate.

In this case, the final received signal strength output from the final received signal strength estimation module 146 is not used. Also, in step 628, the module activation timing determination module 148 sets the operation time point of the EQ weight calculation module to time point T1 before the main EQ module 105 is activated. Here, time point T1 may be a minimum early activation time point in an early activation time interval corresponding to QPSK.

In the present invention, as illustrated in FIG. 6, the moving speed of the mobile terminal, estimated in the Doppler estimator 110, is identified as low, medium, or high, and one of modulation schemes of QPSK, 16 QAM, and 64 QAM, which can maximize the data receive rate of the mobile terminal, is detected based on the identified information. If the data receive rate-maximizing modulation scheme is detected, an early activation time interval corresponding to the detected modulation scheme is determined. Also, a final received signal strength is estimated by summing SINR values from the RAKE receiver 130 and the EQ 100, which are provided with weights respectively, and the operation time point of the EQ weight calculation module 103 within the early activation time interval is determined based on the final received signal strength.

The reason why each of the SINR values of the RAKE receiver 130 and the EQ 100 is provided with a weight is as follows:

The SINR value of the RAKE receiver 130 is estimated at a time point earlier than a time point when the SINR value of the EQ 100 is estimated, but is not accurate enough to control the operation of the EQ 100. Alternatively, the SINR value of the EQ 100 is so accurate as to control the operation of the EQ 100, but has a problem in that it is somewhat a past value because it is measured when the EQ 100 is previously activated.

Accordingly, weights values to be applied to the SINR values of the RAKE receiver 130 and the EQ 100 respectively are determined with respect to a time point when the SINR value of the EQ 100 is measured. As an example, each of first and second weight values to be applied to the SINR values of the RAKE receiver 130 and the EQ 100 respectively may be one of weights values included in a weight set, such as {1, 0, 0.8, 0.5, 0.2} or {1, 0.5, 0}.

Reference will now be made to a procedure of determining the first and second weight values that the weight calculation module 144 uses to estimate a final received signal strength, with reference to FIG. 7.

Figure 7:
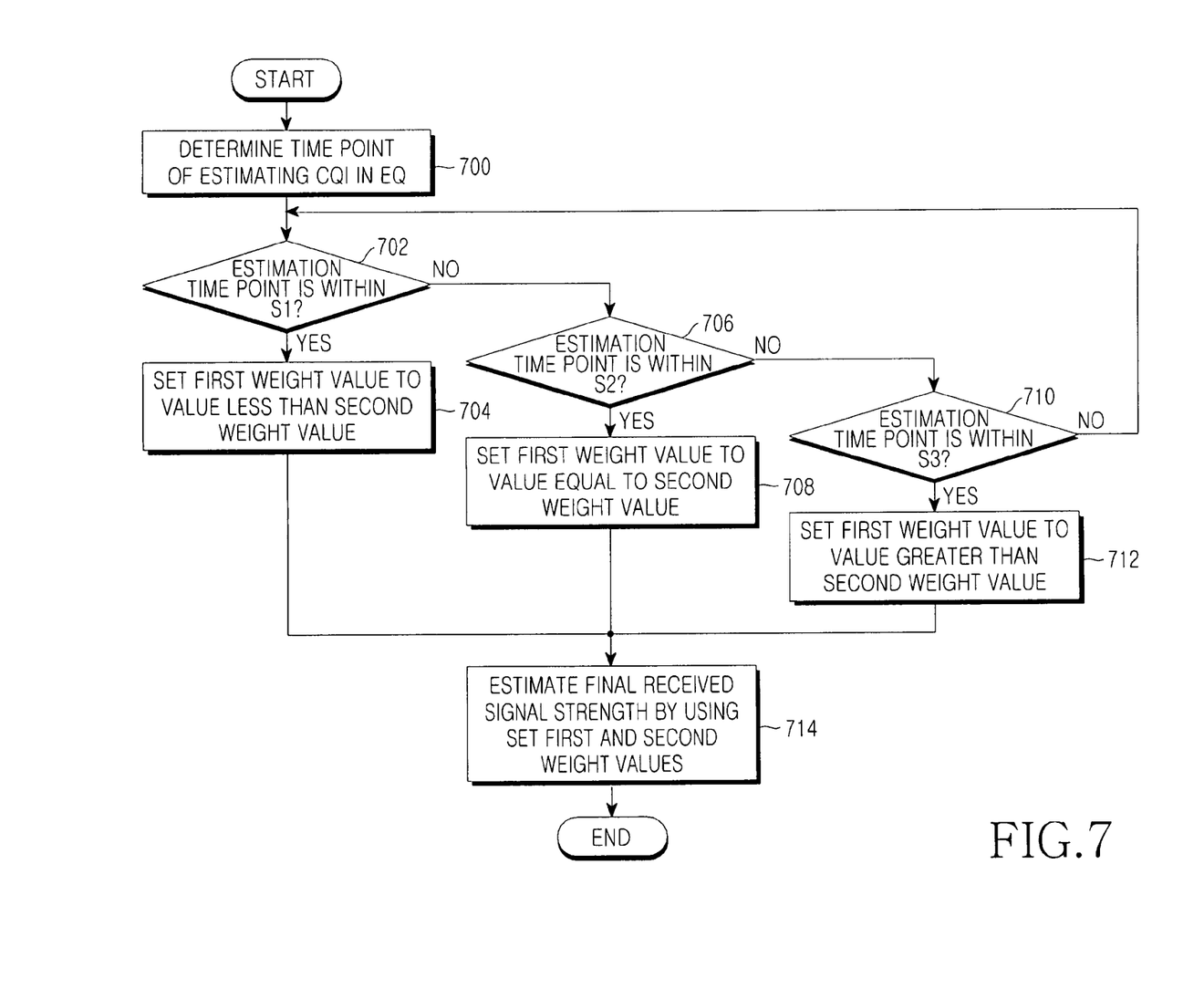
FIG. 7 illustrates a procedure of determining first and second weights by a weight calculation module in accordance with an exemplary embodiment of the present invention.

FIG. 7 illustrates a procedure of determining the first and second weight values by the weight calculation module 144 according to an exemplary embodiment of the present invention.

Referring to FIG. 7, in step 700, the weight calculation module 144 determines a time point of estimating a CQI in the EQ 100. As an example, the weight calculation module 144 may determine the time point of estimating a CQI in the EQ 100 by using information on a time point when an SINR value received from the data signal strength estimator 120 is estimated.

In FIG. 7, by way of example, it is assumed that the time point of estimating a CQI in the EQ 100 is determined on the basis of S1 to S3 values. The S1 value may represent a time point that is five operation cycles ahead of a current time point, the S2 value may represent a time point that is three operation cycles ahead of a current time point, and the S3 value may represent a time point that is one operation cycle ahead of a current time point. Of course, the time point of estimating a CQI in the EQ 100 may be determined on the basis of values other than the S1 to S3 values.

In step 702, the weight calculation module 144 determines if the time point of estimating a CAI in the EQ 100 (hereinafter referred to as the "estimation time point") is within S1, that is, the time point five operation cycles ahead of a current time point. When the estimation time point is within S1, the weight calculation module 144 determines that a time point of measuring an SINR value in the EQ 100 is later than a time point of measuring an SINR value in the RAKE receiver 130. Thereupon, the weight calculation module 144 proceeds to step 704, and sets the first weight value to a value less than the second weight value.

When the estimation time point is not within S1 in step 702, the weight calculation module 144 proceeds to step 706, and determines if the estimation time point is within S2, that is, the time point three operation cycles ahead of the current time point. When the estimation time point is within S2, the weight calculation module 144 determines that the time point of measuring an SINR value in the EQ 100 and the time point of measuring an SINR value in the RAKE receiver 130 approximate each other. Thereupon, the weight calculation module 144 proceeds to step 708, and sets the first weight value to the same value as the second weight value.

When the estimation time point is not within S2 in step 706, the weight calculation module 144 proceeds to step 710, and determines if the estimation time point is within S3, that is, the time point one operation cycle ahead of the current time point. When the estimation time point is within S3, the weight calculation module 144 determines that the time point of measuring an SINR value in the EQ 100 is earlier than the time point of measuring an SINR value in the RAKE receiver 130. Thereupon, the weight calculation module 144 proceeds to step 712, and sets the first weight value to a value greater than the second weight value.

Once the first and second weight values are set in steps 704, 708, and 712, the weight calculation module 144 estimates a final received signal strength by using the set first and second weight values in step 714.

In this way, FIG. 7 shows to which extent weights need to be applied to SINR values in the RAKE receiver 130 receiving a control channel signal and the EQ 100 receiving a data channel signal respectively in determining the final received signal strength.

That is, pursuant to FIG. 7, a weight is added to an SINR value of the EQ when the SINR value of the EQ is estimated at a time point neighboring a current time point. In the opposite case, a weight is added to an SINR value of the RAKE receiver. As a result, the first and second weight values are determined depending on a time point when an SINR value of the EA is measured.

As described above, the present invention has an advantage in that the power consumption of an equalizer can be minimized, and at the same time, the overall data reception performance can be improved without any problem, such as a ping-pong effect, by operating the constituent modules of the EQ step by step. Also, the present invention has a further advantage in that the EQ can be more efficiently operated according to a modulation scheme used in a mobile terminal and a final received signal strength.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for receiving a signal by a mobile terminal in a wireless communication system, the method comprising:
maintaining a channel estimation module in an active state;
determining an activation time point of an equalizer weight calculation module to calculate a tap coefficient for a main equalizer module, the activation time point of the equalizer weight calculation module being earlier than an activation time point of the main equalizer module;
activating the equalizer weight calculation module at the determined activation time point so as to calculate the tap coefficient;
activating the main equalizer module so that the main equalizer module can receive the tap coefficient when an operation of the equalizer weight calculation module is completed;
detecting a mobile terminal identifier (ID) by demodulating a control signal received over a control channel, activating an interference cancellation module so as to receive a data signal over a data channel when the detected mobile terminal ID corresponds to an ID of the mobile terminal, and controlling the main equalizer module to provide the data signal, which is compensated for by the tap coefficient, from an output of the main equalizer module to a data signal demodulator; and
demodulating the compensated data signal in the data signal demodulator.

2. The method according to claim 1, wherein the activation time point of the equalizer weight calculation module is determined based on a modulation scheme to be used in the data channel, and a final received signal strength obtained in consideration of strengths of the data signal and the control signal.

3. The method according to claim 2, wherein the final received signal strength comprises a value obtained by summing a first value and a second value, the first value being calculated by applying a first weight value to the strength of the data signal, and the second value being calculated by applying a second weight value to the strength of the control signal.

4. The method according to claim 3, wherein the first and second weight values are determined based on a time point when the strength of the data signal is measured.

5. The method according to claim 2, wherein determining the activation time point of the equalizer weight calculation module comprises:
estimating moving speed of the mobile terminal, and based on the estimated moving speed, detecting a modulation scheme supporting a maximum data receive rate among modulation schemes available for the data channel;
based on the detected modulation scheme, calculating a maximum early activation time point that is an earliest time point at which the equalizer weight calculation module may be operated before the activation time point of the main equalizer module; and
depending on a level of the final received signal strength, determining the activation time point of the equalizer weight calculation module among time points ranging from the maximum early activation time point to the activation time point of the main equalizer module.

6. An apparatus capable of receiving a signal by a mobile terminal in a wireless communication system, the apparatus comprising:
a data channel receiver comprising a channel estimation module, an equalizer weight calculation module, a main equalizer module, and an interference cancellation module;
a data signal demodulator configured to demodulate a signal output from the data channel receiver; and
a module activation controller configured to determine an activation time point of the equalizer weight calculation module, the activation time point of the equalizer weight calculation module being earlier than an activation time point of the main equalizer module, wherein the channel estimation module is maintained in an active state, wherein the equalizer weight calculation module is activated at the activation time point determined by the module activation controller so as to calculate a tap coefficient for the main equalizer module, wherein the interference cancellation module is activated so as to receive a data signal over a data channel when a mobile terminal identifier (ID) detected by demodulating a control signal received over a control channel corresponds to an ID of the mobile terminal, wherein the main equalizer module is activated so as to receive the tap coefficient when an operation of the equalizer weight calculation module is completed, and outputs the data signal compensated for by the tap coefficient to the data signal demodulator when the detected mobile terminal ID corresponds to the ID of the mobile terminal, and wherein the data signal demodulator demodulates the compensated data signal.

7. The apparatus according to claim 6, wherein the module activation controller is configured to determine the activation time point of the equalizer weight calculation module, based on a modulation scheme to be used in the data channel, and a final received signal strength obtained in consideration of strengths of the data signal and the control signal.

8. The apparatus according to claim 7, wherein the final received signal strength comprises a value obtained by summing a first value and a second value, the first value being calculated by applying a first weight value to the strength of the data signal, and the second value being calculated by applying a second weight value to the strength of the control signal.

9. The apparatus according to claim 8, wherein the first and second weight values are determined based on a time point when the strength of the data signal is measured.

10. The apparatus according to claim 7, wherein the module activation controller is configured to estimate moving speed of the mobile terminal, detect a modulation scheme supporting a maximum data receive rate among modulation schemes available for the data channel, based on the estimated moving speed, calculate a maximum early activation time point that is an earliest time point at which the equalizer weight calculation module may be operated before the activation time point of the main equalizer module, based on the detected modulation scheme, and determine the activation time point of the equalizer weight calculation module among time points ranging from the maximum early activation time point to the activation time point of the main equalizer module, depending on a level of the final received signal strength.

* * * * *